April 11, 1967 C. D. ERICKSON 3,313,155
FLUID FLOW METER
Filed June 17, 1964 2 Sheets-Sheet 2
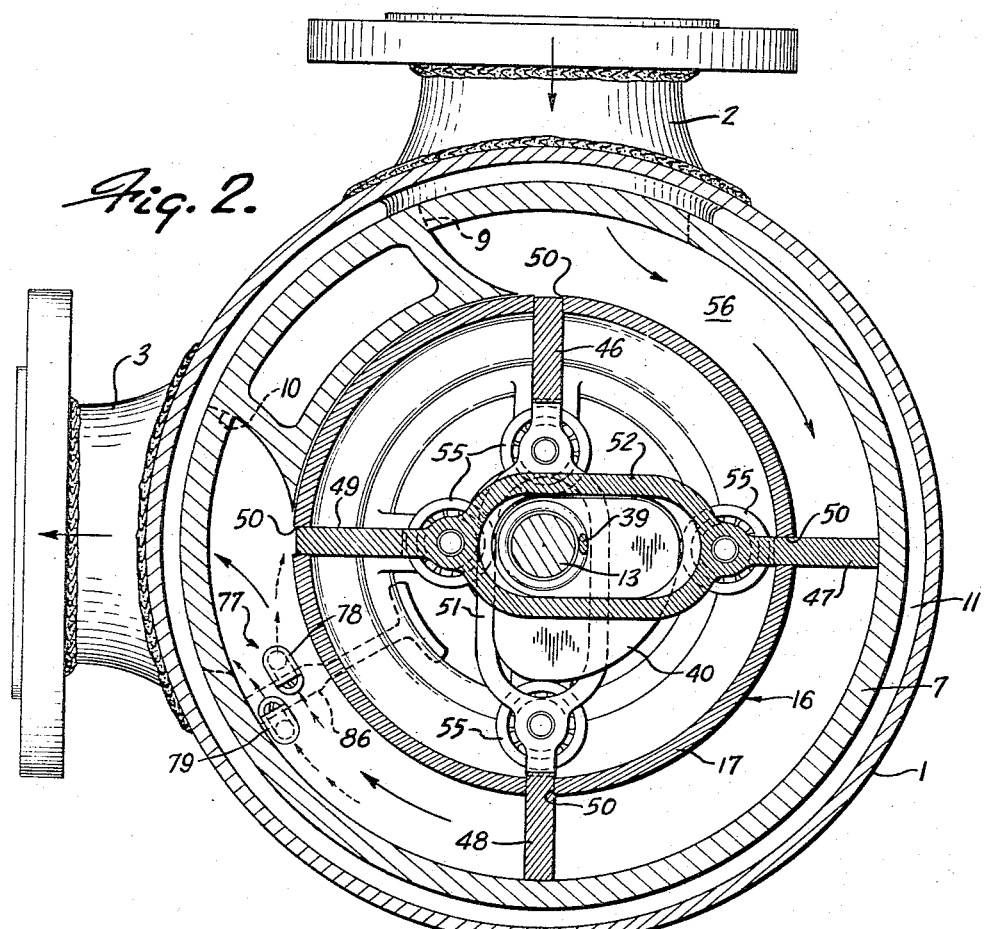
Fig. 2.
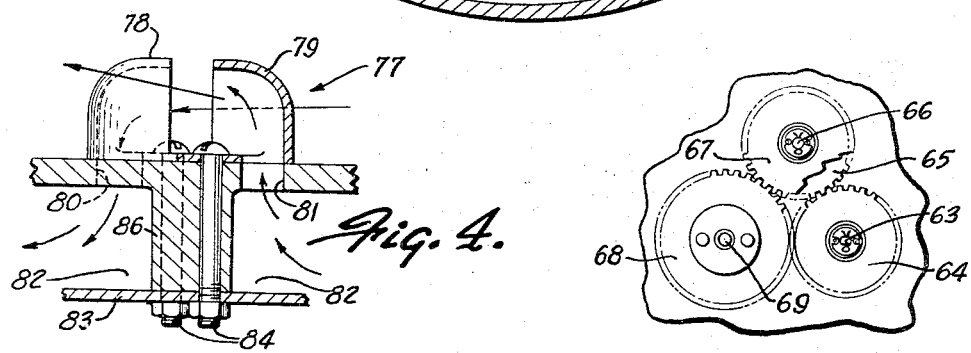
Fig. 4.
Fig. 3.
Fig. 5.
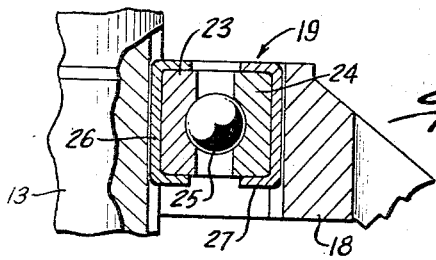
INVENTOR.
CHARLES D. ERICKSON
BY
Andrus & Starke
ATTORNEYS 3,313,155
FLUID FLOW METER
Charles D. Erickson, Erie, Pa., assignor to A. O. Smith Corporation, Milwaukee, Wis., a corporation of New York
Filed June 17, 1964, Ser. No. 375,866
4 Claims. (Cl. 73—259)

This invention relates to a fluid measuring apparatus and more particularly to a rotary, positive displacement-type meter for measuring petroleum and other liquid products.

A rotary, positive displacement-type meter includes an accurately machined housing and a cylindrical rotor is mounted within the housing and revolves around a central shaft and a stationary cam. A series of blades are movable in radial slots in the cylindrical rotor, and as liquid enters the housing it contacts an extended blade, causing the blades and rotor to rotate within the housing. As the blades rotate, they ride on the surface of the fixed cam with the result that the blades move radially within the slots as they rotate. The blade nearest the inlet in the housing is moved outwardly toward the housing wall by the cam in position to be contacted by the liquid stream. As the next succeeding blade moves toward the inlet, this blade is also moved outwardly by the cam so that a measuring chamber of precise volume is formed between the two outwardly extending blades, the rotor wall and the housing wall. During rotation of the rotor, a continuous series of closed measuring chambers are produced, and the rotation of the rotor is transmitted through a suitable drive mechanism to a counter, which records the measured amount of liquid passing through the housing.

The present invention is directed to an improvement in the rotary positive displacement-type meter. In the meter of the invention, the rotor is journalled by bearing assemblies around a central fixed shaft, and the bearing races of the bearing assemblies are keyed to the rotor and to the fixed shaft, respectively. Keying of the bearing races to the respective elements permits vertical or longitudinal movement of the races, but prevents rotary movement of the races with respect to the elements. This construction enables the entire weight of the rotor assembly to be carried on the thrust bearings, and the locked bearing races also permit the bearings to act similar to a ball mill and grind up foreign matter caught within the bearing and thereby prevent locking or seizing of the bearings.

In addition, provision is made for creating a circulating, turbulent flow of liquid within the base portion of the meter. This flow, which is separate from the flow of the liquid being measured between the rotor blades, serves to prevent the stratification of the liquid and eliminates the precipitation of foreign material within the bottom of the rotor chamber.

Other objects and advantages will appear in the course of the following description.

The drawings illustrate the best mode presently contemplated of carrying out the invention.

In the drawings:

FIG. 2 is a transverse section taken along line 2—2 of FIG. 1;

FIG. 3 is a fragmentary section taken along line 3—3 of FIG. 1;

FIG. 4 is an enlarged fragmentary vertical section showing the structure for circulating liquid in the base portion of the meter housing; and FIG. 5 is an enlarged fragmentary section showing the bearing construction.

Figure 1:
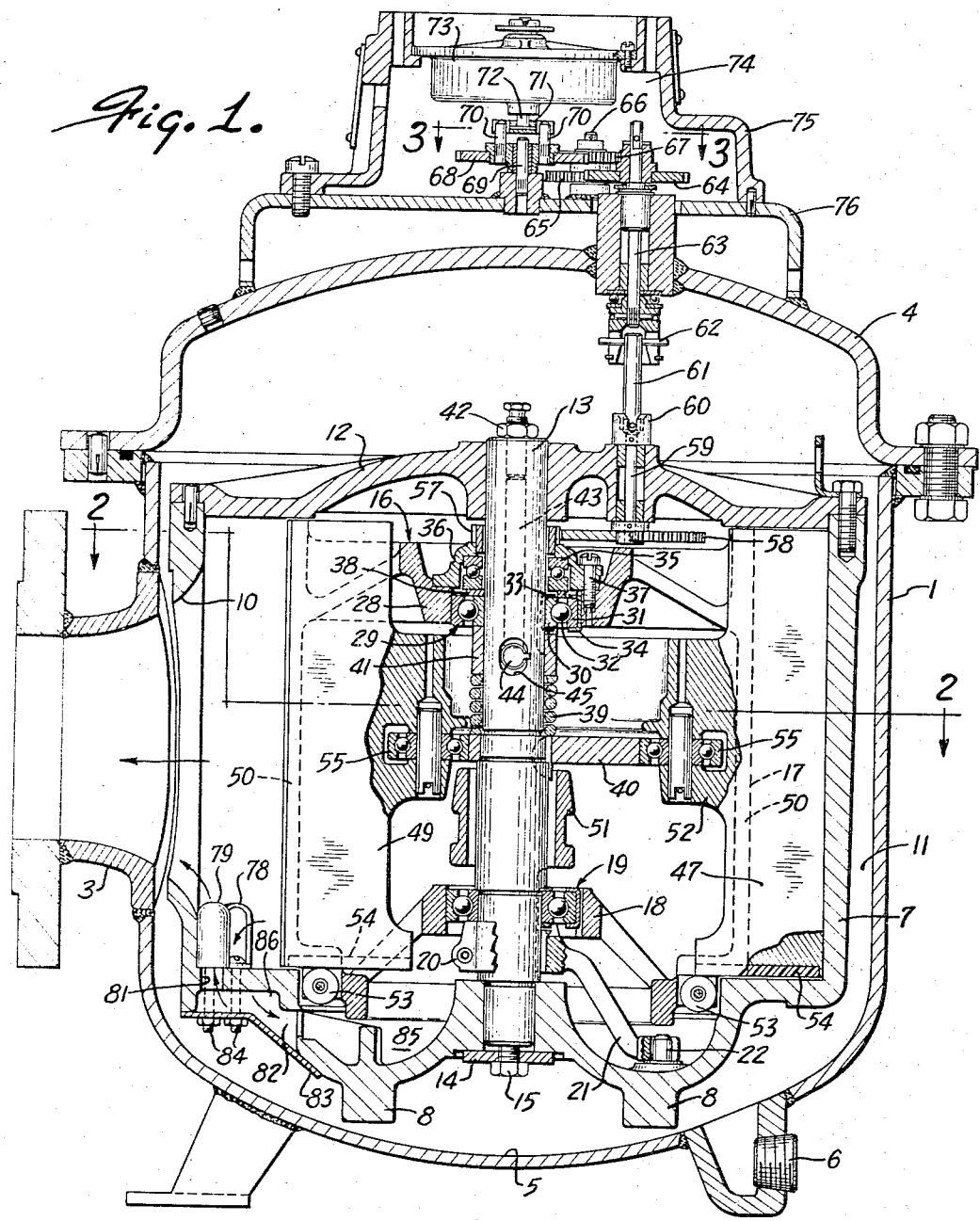
FIG. 1 is a vertical section of the meter of the invention.

The drawings illustrate a rotary, positive displacement meter for measuring petroleum or other liquid products. The meter includes an outer casing 1 which is provided with a liquid inlet 2 and a liquid outlet 3. The open top of the outer casing 1 is enclosed by a cover 4.

To permit the drainage of liquid from the outer casing, a sump 5 is provided in the bottom portion of the casing and the sump is provided with a drain opening, which is enclosed by a plug 6.

A generally cylindrical housing 7 having an accurately machined inner surface is disposed in spaced relation within the outer casing 1 and is supported within the casing by a series of legs 8. The housing 7 is provided with an inlet opening 9 which communicates with inlet 2 in the outer casing and similarly, the housing is provided with an outlet opening 10 which communicates indirectly with the outlet 3 in the casing 1. The housing 7 is spaced inwardly from the outer casing 1 providing an annular chamber 11 therebetween. Indirect communication between outlet ports 10 and 3 allows fluid to enter chamber 11 and thus provide equal pressure across inner housing 7. The open top of the housing is enclosed by a cover 12 which is bolted to the upper edge of the housing 7.

A non-rotating shaft 13 is mounted centrally of the housing 7. The lower end of the shaft 13 extends through an opening in the bottom surface of the housing 7 and is retained within the housing by a keeper plate 14 and a bolt 15 which is threaded into the lower end of the shaft. The upper end of shaft 13 extends through an opening in cover 12.

A rotor 16 is mounted for rotation on the central shaft 13 and includes a generally cylindrical shell 17 which is spaced inwardly from the cylindrical wall of the housing 7. The lower end of the rotor 16 includes a lower bearing support 18 which supports a bearing assembly 19. Bearing assembly 19 is supported by a hub 20 which surrounds and is secured to the shaft 13. Leg 21 is carried by hub 20 and the lower end of leg 21 has an opening which engages aligning pin 22 secured to the housing 7.

As best shown in FIG. 5, the bearing assembly 19 includes an inner race 23 and an outer race 24 which are separated by a plurality of ball bearings 25. According to the invention, the inner race 23 is keyed to the shaft 13 by a key 26, and similarly, the outer race 24 is keyed the lower bearing support 18 by a pressure-sensitive key 27.

The upper end of the rotor 16 includes an upper bearing support 28 which supports an upper bearing assembly 29. The bearing assembly 29 is similar to bearing assembly 19 and includes an inner race 30, an outer race 31 and a plurality of ball bearings 32. As in the casing of bearing assembly 19, the inner race 30 is keyed to the shaft 13 by a pressure-sensitive key 33 and the outer race is keyed to the bearing support 28 by a similar key 34.

A thrust bearing 35 is located upwardly of the bearing assembly 29 and is retained by a bearing cap 36 which is secured to the upper portion of the rotor by bolts 37. The thrust bearing 35 is spaced from the upper bearing assembly 29 by a notched washer 38.

To urge the rotor 16 and bearing assemblies 19 and 29 upwardly toward the thrust bearing 35, a coil spring 39 is disposed around the shaft 13. The lower end of the spring 39 bears against a cam 40 secured to the shaft, and the upper end of the spring bears against a collar 41 which is disposed in engagement with the lower end of the bearing assembly 29.

By keying the bearing races of bearing assemblies 19 and 29 to the respective elements, the races can move vertically but rotation of the races is prevented. This enables the spring 39 to urge the rotor 16 and bearing assemblies 19 and 29 upwardly against the thrust bearing 35.

The length of spring 39 can be adjusted by means of an adjusting screw 42 which is threaded within an opening in the upper end of the shaft 13. The lower end of the adjusting screw 42 bears against a vertical pin 43 which is slidable within a central opening in the shaft 13, and the lower end of the pin 43 bears against a crosspin 44 which extends radially outward through a slot 45 in the shaft 13 and through aligned openings in the collar 41. By threading the adjusting screw 42 downwardly within the end of the shaft 13, the collar 41 will be moved downwardly against the force of the spring 39.

A series of blades 46, 47, 48 and 49 are mounted for sliding movement within vertical slots 50 formed in the shell 17 of the rotor 16. Blades 46 and 48 are located diametrically opposite and are connected by a yoke 51 which straddles the central shaft 13. Blades 47 and 49 are also located diametrically opposite and are connected by a yoke 52 which also straddles the shaft 13 at a location above the yoke 51. With this construction, blades 46 and 48 move in unison, while blades 47 and 49 also move together.

The blades 46–49 are mounted for sliding movement within the slots 50 by a series of rollers 53 which are journalled within the lower end of the rotor 16 and are located in alignment with the slots 50. The lower edge of each of the blades is provided with a thermosetting resin wear strip 54 which is located within a recess in the lower edge of the blade. The wear strip can be formed of any hard, thermosetting resin, such as an epoxide resin, or the like, and serves to prevent wear of the blade as it moves radially inward and outward on the support rollers 53.

The blades 46–49 are moved radially inward and outward by cam followers or rollers 55 which are journalled on the inner edges of the blades and ride on the cam 40 which is secured to the central shaft 13. As best shown in FIG. 2, the liquid entering the housing inlet opening 9 passes into the chamber 56 between the shell 17 of the rotor and the inner surface of the housing 7. The liquid moving into the chamber 56 contacts the extended blade 47, as shown in FIG. 2, and serves to rotate the rotor 16 and blades in the direction of the arrow. As the rotor rotates, the cam follower 55 of the next blade 46 will ride up the inclined surface of the cam 40 to thereby move the blade 46 outwardly within the slot 50, and the blade 46 will then be contacted by the liquid stream. As shown in FIG. 2, the blades 47 and 48 are at their outermost position and define a measuring chamber therebetween, while the blades 46 and 49 are located in their innermost position and do not project beyond the shell 17 of the rotor 16. The flow of liquid within the chamber 56 provides a continuous uniform rotation of the rotor 16 and the rotor rotation is transmitted through a suitable drive mechanism to a counting device.

As shown in FIG. 1, the upper bearing assembly 29, which is part of the rotor 16, and the bearing cap 36 rotate about the shaft 13. A gear 57 is secured to the bearing cap 36 and meshes with a gear 58 secured to the vertical shaft 59, which is journalled within an opening in the housing cover 12. The upper end of shaft 59 is connected by coupling 60 to a pin 61 and the upper end of pin 61 is connected by coupling 62 to the lower end of a pin 63. The upper end of the pin 63 carries a gear 64 which meshes with a gear 65 on shaft 66. Shaft 66 also carries a gear 67 which engages gear 68 on shaft 69. The gear 68 is connected by splined pins 70 and crossbar 71 to a shaft 72 which is connected through a conventional meter calibration mechanism, indicated generally by 73, to an indicator, not shown.

The gears 64, 65, 67 and 68 are located out of the liquid zone in a chamber 74 defined by adapter 75. The adapter 75 is bolted to the upper surface of a head 76 which is welded to the casing cover 4. By locating the gears in chamber 74, the gears are more accessible and can be readily changed or replaced for maintenance to permit reverse flow through the meter.

To prevent the accumulation of foreign material within the bottom portion of the housing 7 which may adversely affect the bearing assembly 19, a provision is made for circulating the liquid within the lower portion of the housing. As best shown in FIGS. 1 and 4, a Pitot member 77 is located within the flow path of the liquid adjacent the outlet opening 10 in the housing 7. The Pitot member 77 includes an inlet hood 78 which faces toward the directional flow of the liquid, and an outlet hood 79 is located adjacent the inlet hood 78 and faces in the opposite direction, or in the direction of liquid flow. The hoods 78 and 79 communicate through openings 80 and 81 with a chamber 82 defined by a plate 83 and the lower end of the housing 7. The plate 83 is secured to the housing 7 by bolts 84 which also serve to attach the Pitot member 77 to the housing.

The chamber 82 communicates with the annular trough 85 in the lower end of the housing, and a divider wall 86 extends transversely of the trough 85 and chamber 82 and is located between the openings 80 and 81. Bolts 84 extend through holes in the divider wall 86.

As shown in FIG. 4, a portion of the liquid moving within chamber 56 to the housing outlet 10 is deflected downwardly by hood 78 through the opening 80 into the chamber 82. This deflected liquid then circulates within the annular trough 85 in housing 7. As the liquid returns to the area of the outlet opening 10 of the housing, it is directed upwardly by the flow divider 86 through opening 81 and hood 79 and back into the flow stream and out through the outlet opening 10. The Pitot member 77, in combination with the flow divider 86 provides a turbulent circulation of the otherwise static liquid within the lower portion of the housing 7 which prevents settling and accumulation of foreign material in this part of the housing. The accumulation of foreign material may cause excessive wear on the lower bearing assembly 19.

The chamber 11 is adapted to contain static liquid at a pressure substantially the same as the pressure of the liquid moving within chamber 56. This balance of pressure insures that the accurately machined housing 7 will not be distorted by the internal pressure and any distortion or change in shape as a result of internal hydraulic pressure will be reflected in the outer casing 1 and not the housing 7.

Various modes of carrying out the invention are contemplated as being within the scope of the following claims particularly pointing out and distinctly claiming the subject matter which is regarded as the invention.

I claim:

1. In a liquid measuring apparatus, a casing having a liquid inlet and a liquid outlet, a central post disposed within the casing, a cylindrical rotor journalled on the post and spaced inwardly of the casing to provide a chamber therebetween communicating with the inlet and the outlet, said rotor having a series of circumferentially spaced vertical slots therein, a blade slidably disposed within each slot of the rotor and disposed to be moved outwardly into the flow path of liquid moving within the chamber to thereby rotate the rotor with rotation of the rotor being transmitted to a counting mechanism, the lower portion of the casing beneath the blades defining a generally annular trough, first liquid diverting means extending into said chamber for diverting a portion of the liquid flowing in the chamber from the inlet to the outlet into said trough, and second flow diverting means located in said trough for diverting the liquid flowing within the trough back to said chamber, the flow of liquid within the trough serving to prevent the settling of foreign matter within said trough.

2. In a liquid measuring apparatus, a casing having a liquid inlet and a liquid outlet, a central post disposed within the casing, a cylindrical rotor journalled on the post and spaced inwardly of the casing to provide a chamber therebetween communicating with the inlet and the outlet, said rotor having a series of circumferentially spaced vertical slots therein, a blade slidably disposed within each slot of the rotor and disposed to be moved outwardly into the flow path of liquid moving within the chamber to thereby rotate the rotor with rotation of the rotor being transmitted to a counting mechanism, the lower portion of the casing beneath the blades defining a sump, a divider wall disposed in the sump and extending across a portion of the sump, first flow diverting means located between the divider wall and said outlet for diverting a portion of liquid flowing from the inlet to the outlet in said chamber into said sump, and second flow diverting means located on the opposite side of the wall from said first flow diverting means for diverting liquid flowing in said sump back to said chamber for discharge through said outlet.

3. In a liquid measuring apparatus, a casing having a liquid inlet and a liquid outlet, a central post disposed within the casing, a cylindrical rotor journalled on the post and spaced inwardly of the casing to provide a chamber therebetween communicating with the inlet and the outlet, said rotor having a series of circumferentially spaced vertical slots therein, a blade slidably disposed within each slot of the rotor and disposed to be moved outwardly into the flow path of liquid moving within the chamber to thereby rotate the rotor with rotation of the rotor being transmitted to a counting mechanism, the lower portion of the casing beneath the blades defining a generally annular trough, a divider wall located between the inlet and outlet, in the direction of liquid flow in said chamber and extending radially within the trough, a first flow diverting member located ahead of the wall in the direction of liquid flow and having an opening facing against the direction of liquid flow in the chamber, said first flow diverting member communicating with the trough and a portion of the liquid flowing within the chamber from the inlet to the outlet entering said flow diverting member and flowing downwardly into the trough, and a second flow diverting member located to the rear of the wall in the direction of liquid flow and having an opening facing in the direction of liquid flow in the chamber, said second flow diverting member communicating with the trough and liquid within the trough passing upwardly through the second flow diverting member to the chamber and then to the outlet in the casing.

4. In a liquid measuring apparatus, a casing having a liquid inlet and a liquid outlet, a central post disposed within the casing, a cylindrical rotor journalled on the post and spaced inwardly of the casing to provide a chamber therebetween communicating with the inlet and the outlet, said rotor having a series of circumferentially spaced vertical slots therein, a blade slidably disposed within each slot of the rotor and disposed to be moved outwardly into the flow path of liquid moving within the chamber to thereby rotate the rotor with rotation of the rotor being transmitted to a counting mechanism, the lower portion of the casing beneath the blades defining a sump, a first flow diverting member located in said chamber ahead of the outlet and having an opening facing generally against the direction of liquid flow in the chamber, said first flow diverting member communicating with the sump and a portion of the liquid flowing within the chamber from the inlet to the outlet entering said flow diverting member and flowing downwardly into the sump, a second flow diverting member located in said chamber between said first flow diverting member and the outlet and having an opening facing in the opposite direction from the opening in said first flow diverting member, said second flow diverting member communicating with the sump and the liquid within the sump passing upwardly through the second flow diverting member to the chamber and then to the outlet in the casing, and a baffle member located in the sump at the outer periphery of said sump and extending generally radially of said casing, said baffle member positioned between the locations of communication between the first and second flow diverting members and said sump.

References Cited by the Examiner
UNITED STATES PATENTS 2,207,182   7/1940   Smith _____ 73—254 X RICHARD C. QUEISSER, *Primary Examiner.*

E. D. GILHOOLY, *Assistant Examiner.*